July 24, 1934.　　　　F. G. WELKE　　　　1,967,387
CONNECTING ROD REAMER
Filed Feb. 19, 1930　　2 Sheets-Sheet 1
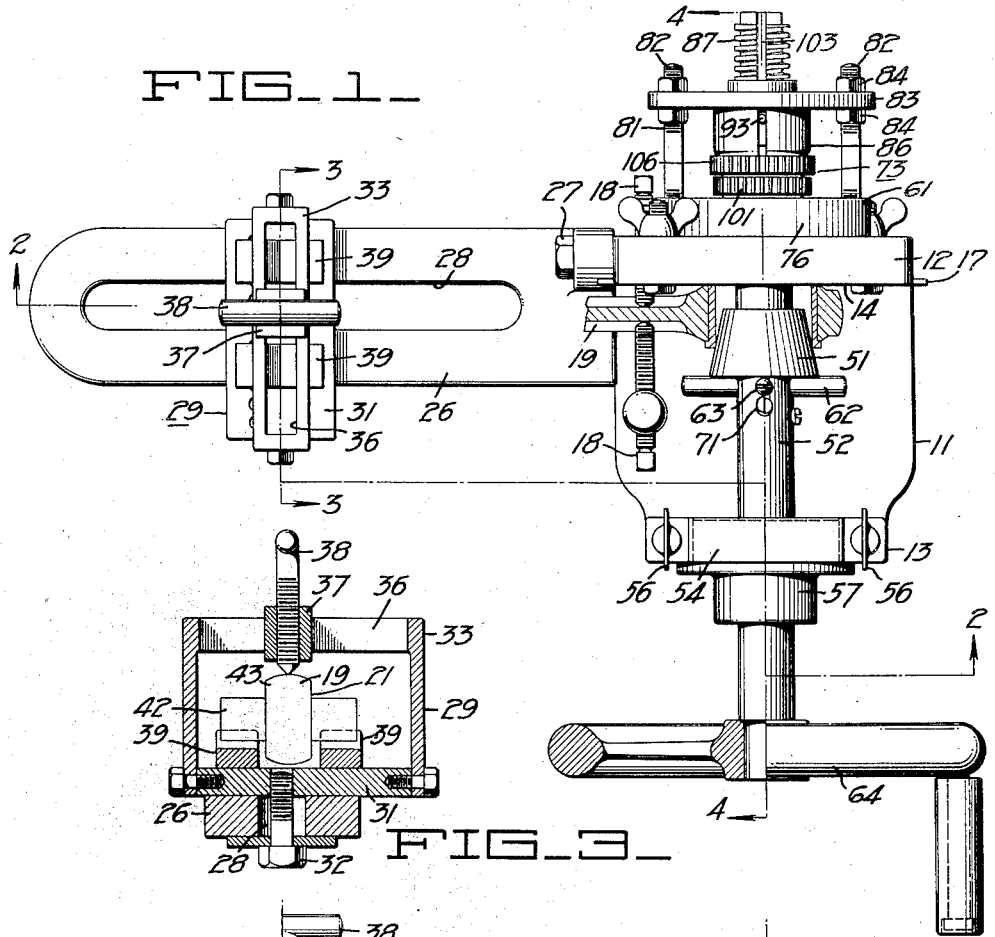
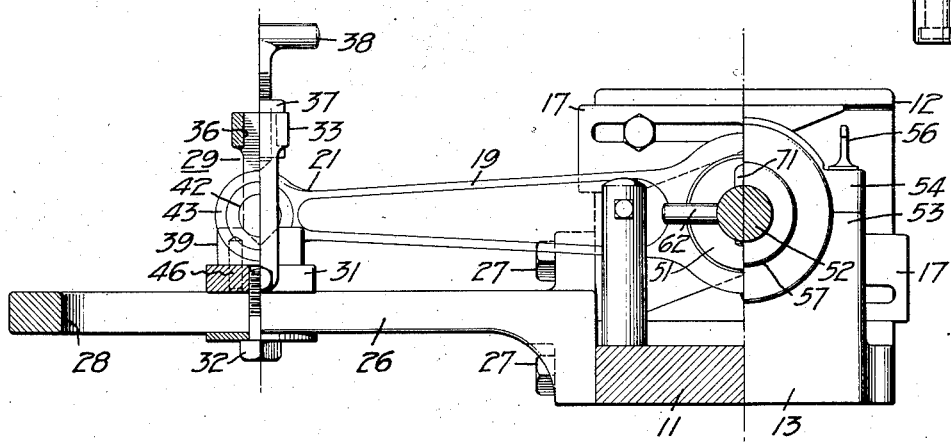
INVENTOR.
Ferdinand G. Welke
BY
ATTORNEY July 24, 1934.    F. G. WELKE    1,967,387
CONNECTING ROD REAMER
Filed Feb. 19, 1930    2 Sheets-Sheet 2
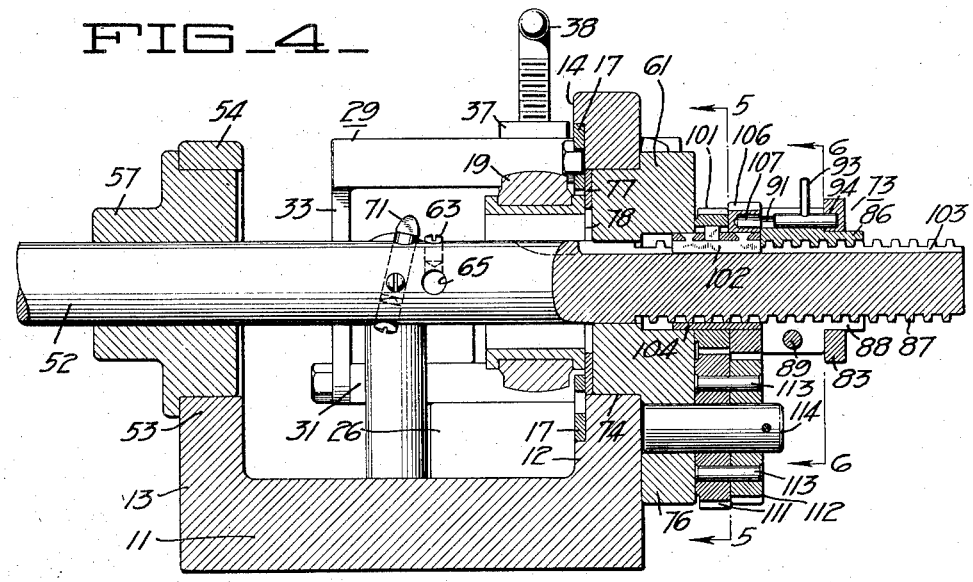
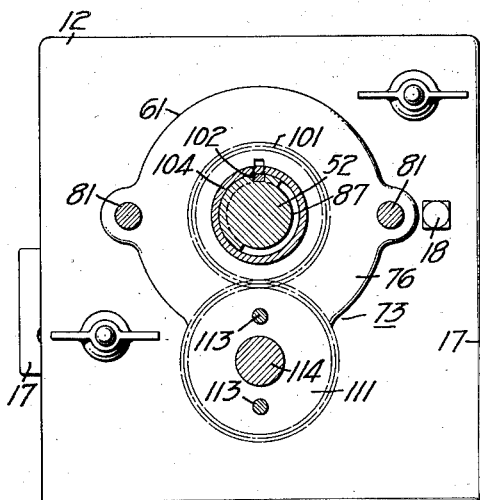
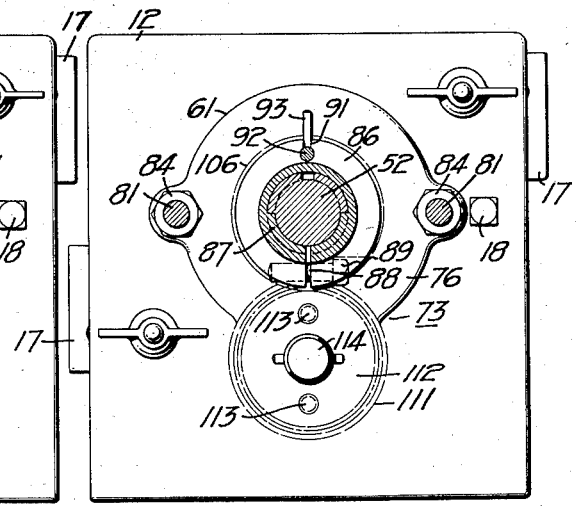
INVENTOR.
Ferdinand G. Welke
BY
ATTORNEY Patented July 24, 1934

1,967,387

UNITED STATES PATENT OFFICE 1,967,387

CONNECTING ROD REAMER

Ferdinand G. Welke, San Francisco, Calif.

Application February 19, 1930, Serial No. 429,705

1 Claim. (Cl. 77—62)

This invention relates to a device for conducting machine operations such as the reaming of bearings in connecting rods.

It is the general object of the invention to devise a machine in which mechanisms such as connecting rod bearings may be machined, the mechanism being so provided that its setting up and operation are readily conducted in a speedy and efficient manner.

The invention possesses other advantageous features and objects, some of which, with the foregoing, will be set forth at length in the following description where I shall outline in full that form of connecting rod reamer of my invention which I have selected for illustration in the drawings. In said drawings I have shown one form of connecting rod reamer embodying my invention, but it is to be understood that I do not limit myself to such form since the invention, as set forth in the claim, may be embodied in a plurality of forms.

In the drawings, Figure 1 is a plan view of a device embodying my invention.

Figure 2 is a cross section through the device shown in Figure 1 along the line 2—2 thereof.

Figure 3 is a cross section through the device along the line 3—3, illustrating how a connecting rod is secured against rotation and in a definite position.

Figure 4 is a section through the device shown in Figure 1 along the line 4—4, the view being partly in section and partly in elevation to illustrate the mechanism usually embodying certain features of my invention.

Figure 5 is a cross section through the driving mechanism shown in Figure 4 along the line 5—5.

Figure 6 is a section taken along the line 6—6 of Figure 4 illustrating certain other features of my invention.

Briefly, my invention may be characterized as comprising a frame or other suitable means to which a device such as a connecting rod may be secured so that it may be worked upon, and means for carrying and advancing a tool to work the device. The tool is fed into the device to be worked at a relatively slow rate so that proper finishing of the surface is accomplished and is not "grooved" or "dug out". When it is desired to remove the tool from the work, this may be accomplished at a relatively high rate of speed even though the tool has been fed in at a relatively low rate.

In that form of device illustrated in the drawings, a base 11 having upstanding end portions 12 and 13 cast integrally with it, is adapted to be positioned upon a surface such as a work bench. The bearing to be reamed is attached to face 14 of the upstanding end 12 and, to accomplish this, in a convenient and ready manner, positioning means exemplified by wedges 17, positioned and partially supported on face 14, and securing means typified by adjusting screws 18 are provided. In Figures 1 and 3 of the drawings I have illustrated these positioning means and securing means as engaging a connecting rod 19 to retain it in position against the face 14. I prefer that the wedges 17 be employed to position the bearing since they facilitate and make possible the positioning of a bearing in the device so that if it is removed from the device it may be subsequently returned to the identical position in the device.

With a device such as a connecting rod it is desirable to secure its extending end 21 against movement. In some instances, also, it is desirable to ream out a bearing at a predetermined distance from some other point as, with a connecting rod, the wrist pin bearing 43. To accomplish this, I secure a bracket 26 to the base 11 by studs 27. The bracket is positioned upon the base and provided with a slot 28 so that a carriage 29 may be moved along the bracket to a desired position. The carriage 29 usually comprises a slidable member 31 removably secured by stud 32 to the bracket 26 and having joined to it a U-member 33. The U-member is slotted as at 36 and has positioned in the slot a slide 37 carrying a vertical adjusting screw 38. Blocks 39 having a V notch are usually positioned upon the slidable base 31 to receive a rod indicated at 42 inserted through wrist pin bearing 43 of the connecting rod 19. To ensure that alignment of the bearing to be reamed with respect to the bearing positioned in the V blocks is maintained, the V blocks are conveniently secured to the slidable member by passing pins 46 through the blocks into the base member 31 as shown in Figure 2.

With the carriage 29 set a predetermined distance along the bracket 26, the connecting rod is placed in position against the face 14 with the rod 42 in the V blocks 39. The adjusting screw 38 is then screwed down to contact the rod 19 while the positioning means 17 and the securing means 18 are set up and secured to position the bearing on face 14 to be reamed.

When it is desired to merely ream out the bearing without regard to the distance to the wrist pin bearing, the initial centering of the bearing is accomplished by bringing a centering wedge 51 into contact with it. This is effected by positioning a rod 52 removably and rotatably upon the upstanding supports 12 and 13 to carry the wedge. Upstanding support 13 is split so that it forms lower and upper portions 53 and 54 respectively. Upper portion 54 is secured in position adjustably by the wing headed studs 56. I have found that the setting up operation is facilitated by withdrawing the rod 52 carrying the centering wedge 51 practically entirely from the structure. To facilitate the withdrawal of the rod, bearing 57, in which the rod 52 is rotatably carried, is removably secured in the split support 13 being held by the tension placed upon the upper portion 54 by the studs 56. The rod 52 is supported by the bearing 57 and by a support bearing 61 provided in the upstanding end 12. This construction, supplemented by the wedges 17, enables the bearing being reamed to be removed from the device and to be subsequently returned to the same position so that it may be reamed concentrically with respect to previous reamings.

In operation, with the centering wedge 51 in place on the rod and held against sliding in one direction by pin 62, the rod 52 being positioned in its supporting bearings 57 and 61, the rotation of the rod 52 by hand wheel 64 is effective, through feeding means to be presently described, to bring the wedge into centering contact with the bearing whereupon it is secured in place by the wedges 17, set screws 18 and if a connecting rod, through means on carriage 29, After the centering has been accomplished the rod 52 is withdrawn and the wedge removed. Set screw 63 is released and pin 62 removed from aperture 65 in the rod. The aperture 65 is preferably cut into the rod 52 ahead of a tool 71 so that the tool is not interfered with by the centering operation. The rod 52, after removal of the several centering accessories is positioned in place and feeding mechanism, indicated generally at 73, is enabled to feed the tool into the device to be worked as a bearing at a desired rate.

It is to be remarked that in accordance with my invention I provide means for varying at will the rate of movement of the rod 52 with respect to the bearing. In that form illustrated in the drawings, the upstanding support 12 is apertured as at 74 to receive a block member 76 in which the bearing 61 is provided, the block member being formed to extend only partly through the aperture 74 so that an annular ring 77, turned to fit within the aperture 74 and to have a central opening 78, usually of a larger diameter than the bearing in the connecting rod, may be placed in the aperture 74 so that the tool 71 may be advanced entirely through the bearing. However, the extent of the aperture is such that the tool will usually contact with the annular ring before it comes into engagement with the block 76 so that the block is protected against accidental cutting by the tool. The annular ring is usually of such a soft material as brass and is easily replaceable. Rings having various sizes of annular openings are provided so that accommodation is had for whatever size bearing is to be reamed.

The block 76 is conveniently secured to the upstanding support 12 by screwing studs 81 into the block. The studs 81 are preferably of a considerable length and are threaded upon their ends 82 to carry a plate 83 between nuts 84. The plate 83 is apertured to receive and position a nut 86 which is positioned upon threaded portion 87 of the rod 52. The nut is preferably split as at 88 and the several portions are secured together by a stud 89 so that wear on the nut may be accommodated. A slotted recess 91 is provided in the nut to receive a rod 92 slidable in the recess by means of finger 93 which projects from the slot. The rod 92 is adapted to be inserted into an aperture 94 provided in the plate 83 so that upon rotation of the rod, the nut is retained against rotation and the feeding of the rod through the nut will occur at the rate provided for by the pitch of the threads upon the rod. I have found it expedient to thread the rod with a relatively coarse thread so that when the nut is engaged against rotation by means of the rod 92 projecting into the plate, a rapid rate of feeding of the rod is available. However, since in operation it is expedient to feed the tool into the bearing at a relatively slow rate to secure a smooth surface, I have found it desirable to provide means for reducing the effect of the rotation of the rod with respect to the nut so that the rod is moved longitudinally at a relatively slow rate while revolving for a considerable number of revolutions, thus giving a slow rate of feed.

In the embodiment here shown this is accomplished by providing a spur gear 101 about the rod and to which it is secured by a key 102 engaging longitudinal slot 103 provided in the rod. The gear 101 is conveniently supported rotatably by a sleeve 104 which extends into the block 76 and is rotatably positioned therein. The sleeve 104 also extends to carry another gear 106 which is rotatably positioned upon it for rotation with respect to the spur gear 101 and to the rod. The gear 106 is apertured at 107 to receive the rod 92 in the nut 86 so that the gear and nut may be engaged. Upon rotation of the rod 52, the pin 92 being in engagement with the gear 106 rotation of the rod is ineffective to actuate longitudinal movement of the rod in accordance with the pitch of the thread provided upon the rod. By interposing suitable means between the gears 101 and 106, the rotation of gear 101 may be made effective to drive gear 106 and the nut 86 engaged with it at a desired rate of speed. This is accomplished by providing gears 111 and 112 secured together by pins 113 and rotatably mounted upon a shaft 114 carried in the block 76. The gears 111 and 112 are provided of the proper size to secure the desired rate of feed of the tool into the bearing, usually slower than the rate provided by the thread in the rod. In one of the machines which I have constructed for reaming out bearings, I employed a thread of four threads per inch upon the rod 52 while utilizing gears 101, 106, 111 and 112 of such size and relationship that a feeding rate of the tool was accomplished as if a thread of 72 threads per inch were placed upon the rod. A feeding of the tool into the device or bearing may be thus accomplished at a relatively high rate of speed consistent with the handling of such operations in commercial practice.

The spur gear 101, gear 106 and nut 86 are retained in place by the fitting of the gears 101 and 106 upon the sleeve 104 and by the abutting of the nut 86 with the gear 106. The plate 83 provided upon the studs 81 serve to retain these in position when the rod 52 is removed.

I claim:

A bearing reamer of the class described, comprising a shaft with a cutter thereon, a pair of standards to receive said shaft, a backing plate for supporting a connecting rod between the standards, two wedges secured for parallel horizontal movement on the backing plate and adapted to engage opposite sides of the bearing to be reamed, the backing plate providing on its face spaced parallel guides for the wedges and screws for clamping the wedges, said wedges having slots whereby the screws adjustably secure the wedges to hold the rod in aligned position, and screws for clamping the rod in said bearing reamer.

FERDINAND G. WELKE.